(12) United States Patent
Burget

(10) Patent No.: US 6,557,005 B1
(45) Date of Patent: Apr. 29, 2003

(54) METHOD AND SYSTEM FOR DYNAMICALLY GENERATING WEB FORMS IN A VARIETY OF LANGUAGES

(75) Inventor: Brenda Burget, Meridian, ID (US)

(73) Assignee: Hewlett-Packard Company, Palo Alto, CA (US)

(*) Notice: Subject to any disclaimer, the term of this patent is extended or adjusted under 35 U.S.C. 154(b) by 257 days.

(21) Appl. No.: 09/660,033

(22) Filed: Sep. 12, 2000

(51) Int. Cl.[7] .................. G06F 17/30; G06F 17/60; G06F 15/16
(52) U.S. Cl. .................. 707/102; 707/3; 707/104.1; 705/10; 709/217
(58) Field of Search .................. 707/3, 104.1, 102; 705/10; 600/300; 709/217

(56) References Cited

U.S. PATENT DOCUMENTS

| | | | | | |
|---|---|---|---|---|---|
| 4,069,597 | A | * | 1/1978 | Bigorre ........................ 35/9 |
| 5,404,295 | A | * | 4/1995 | Katz et al. ............. 364/419.19 |
| 5,671,409 | A | * | 9/1997 | Fatseas et al. ............. 707/104 |
| 5,732,274 | A | * | 3/1998 | O'Neill ........................ 395/705 |
| 5,836,771 | A | * | 11/1998 | Ho et al. ..................... 434/362 |
| 5,884,302 | A | * | 3/1999 | Ho .................................. 707/3 |
| 5,964,700 | A | * | 10/1999 | Tallman et al. ............. 600/300 |
| 6,028,601 | A | * | 2/2000 | Machiraju et al. ........... 345/336 |
| 6,064,978 | A | * | 5/2000 | Gardner et al. ............... 705/10 |
| 6,175,833 | B1 | * | 1/2001 | West et al. .................. 707/102 |
| 6,189,029 | B1 | * | 2/2001 | Fuerst ........................ 709/217 |
| 6,311,190 | B1 | * | 10/2001 | Bayer et al. ................ 707/104 |

* cited by examiner

*Primary Examiner*—Frantz Coby

(57) ABSTRACT

A web-site can provide data entry forms for a number of purposes in a number of different languages. The remote user accesses the web-site and specifies the data entry form and language desired. The server at the web-site then accesses a template database defining the layout of the requested data entry form and a question database containing the text and data entry devices for the requested data entry form. If the remote user has requested a language other than a default language, a third database, a language database, is accessed from which counterpart text for the requested data entry form in the language specified by the remote user is obtained. The server then compiles the requested data entry form according to the appropriate template and in the requested language. The completed data entry form is then transmitted to the remote user as an interactive web page.

20 Claims, 2 Drawing Sheets

METHOD AND SYSTEM FOR DYNAMICALLY GENERATING WEB FORMS IN A VARIETY OF LANGUAGES

FIELD OF THE INVENTION

The present invention relates to the field of communication via the Internet or World Wide Web. More specifically, the present invention relates to web-sites at which a user can fill out electronic data entry forms (web forms) that are then sent to the operator of the web-site or others to convey the user's comments, orders, responses, questions, etc.

BACKGROUND OF THE INVENTION

Much has been written about the revolution in communication provided by the Internet and the World Wide Web (the "web"). Using electronic or e-mail, persons connected to the Internet can rapidly and at very little expense exchange messages with each other from virtually anywhere in the world. E-mail is used for personal communications, but is also heavily used for business communications, both within an organization and between different firms.

In addition to the use of e-mail, businesses are also able to communicate over the web with customers and potential customers by providing web-sites that can be browsed at leisure. Web-sites can passively provide customers and potential customers with a wealth of information about a company or firm, in the form of both text and graphics. Additionally, web-sites can allow a user to send electronic messages to the company asking specific questions, making comments and ordering products. Web-sites can also solicit information from and about the user which can then be stored and used by the company.

While web-sites provide tremendous opportunities from companies to interact and communicate with customers and potential customers, the global nature of the web presents language barrier problems. For example, where a company does business throughout or in different parts of the world, that company would desire its web-site to be accessible for communication with customers and potential customers irrespective of the language spoken by those contacts.

In the past, this has generally required that the company set up a separate web-site in each language spoken by the target audience of customers and potential customers. This obviously compounds the company's expense to have and maintain a presence on the World Wide Web. Moreover, it then becomes more difficult to direct customers and potential customers to the appropriate web-site.

Consequently, there is a need in the art for a system and method of providing a single web-site which can interact with users, especially, customers and potential customers, in an appropriate language.

SUMMARY OF THE INVENTION

The present invention is directed to a method and system under which a single web-site can interact with users, e.g., customers and potential customers, in an appropriate language. The invention may be embodied in a web-site for soliciting data from remote users in a plurality of languages. The web-site includes a question database containing questions and data entry devices corresponding to a number of data entry forms that might be selected by a user. The text stored in the question database is in a default language. The data entry devices include any of the following: text fields, radio button groups, check box groups and list boxes. The web-site of this embodiment of the invention also includes a language database containing counterpart text for the text in the question database, the counterpart text being in at least one language other than the default language.

A web-site of the present invention may also include a server connected to the Internet or World Wide Web for receiving and transmitting data. This server accesses the question and language databases to prepare a web page for transmission that includes a data entry form requested by a remote user with text in a language specified by that remote user.

A template database is preferably also included to specify the layout and appearance for each of the data entry forms a user may select. The server accesses the template database, along with the question and language databases, to prepare a data entry form requested by a remote user with text in a language specified by that remote user and in a format specified in the template database.

The present invention also encompasses all the methods for assembling and operating a system such as the one described above. For example, the present invention encompasses a method of operating a web-site for soliciting data from remote users in a plurality of languages by providing a question database containing questions and data entry devices corresponding to a number of data entry forms, where the text stored in the question database is in a default language; and providing a language database containing counterparts for the text in the question database in at least one language other than the default language.

The present invention also encompasses the software for operating a web-site for soliciting data from remote users in a plurality of languages. In one embodiment, the software comprises computer-readable instructions which cause a processing unit to (1) access and manage a question database containing questions and data entry devices corresponding to a number of data entry forms, where the text stored in the question database is in a default language; and (2) access and manage a language database containing counterparts for the text in the question database in at least one language other than the default language.

The computer-readable instructions are preferably run on a server connected to the question and language databases and to the Internet or World Wide Web for receiving and transmitting data. The computer-readable instructions cause the server to access the question and language databases to prepare a web page for transmission that includes a data entry form requested by a remote user with text in a language specified by that remote user.

BRIEF DESCRIPTION OF THE DRAWINGS

The accompanying drawings illustrate the present invention and are a part of the specification. Together with the following description, the drawings demonstrate and explain the principles of the present invention.

DETAILED DESCRIPTION OF THE PREFERRED EMBODIMENTS

Using the drawings, the preferred embodiments of the present invention will now be explained.

Figure 1:
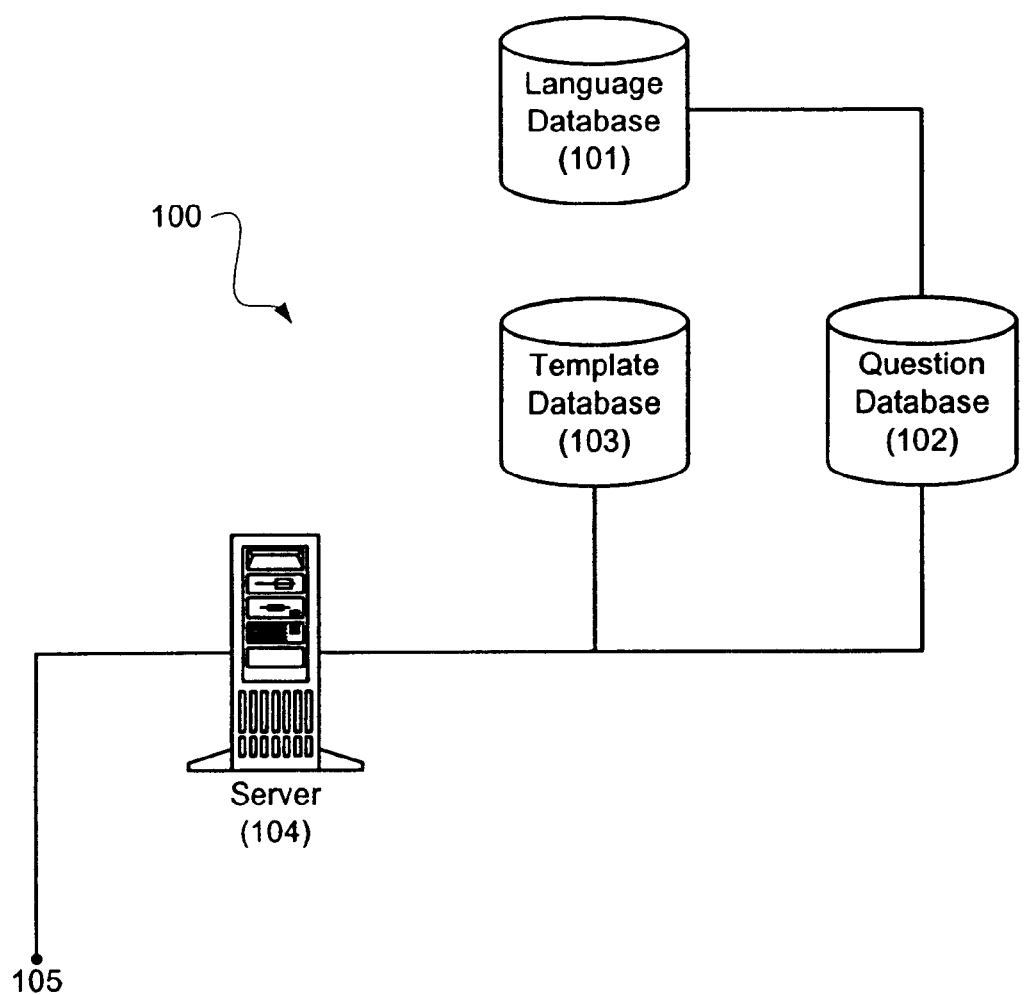
FIG. 1 is a diagram of a web-site system according to the present invention.

FIG. 1 illustrates a web-site system (100) according to the present invention. As shown in FIG. 1, the web-site (100)

includes a server (104) which is connected to the Internet or World Wide Web (105).

Through the connection (105) to the web, the server (104) can be queried by users who are surfing the web with a web browser. The server (104) then transmits the file that is the site's initial web page to the querying user over the web. The user's computer then displays the page for the user. This process may continue as the user links to, i.e. requests, other pages that are part of the web-site resident on the server (104).

During this process, the web-site resident on the server may solicit or receive input from the remote user who is communicating with the site (100) over the web (105). This occurs as follows. The web page transmitted to the remote user contains data entry devices which can receive input from the user. Examples of such data entry devices include, but at not limited to, text fields, radio button groups, check box groups and list boxes.

These interactive data entry devices are Common Gateway Interfaces ("CGIs"), also referred to as CGI scripts, which are written in a programming language such as C or PERL. The CGI scripts are part of the web page transmitted by the web-site (100). The scripts process requests from the remote user's web browser, execute an appropriate program and format the results in hyper-text markup language ("HTML") which can be displayed by a browser.

When the user has entered the data requested by the data entry device, a mechanism is provided by which the entered data is then transmitted from the remote user's computer to the web-site (100). This mechanism may be a button on the web page which when clicked or selected sends the entered data. This mechanism may be actuation of the "enter" key on the remote user's computer. Alternatively, the transmission of entered data may occur automatically as soon as the data is entered.

A brief discussion of each of the types of data entry devices will now be provided. A text field is simply a field in the web page into which the remote user can type an alphanumeric message using a keyboard or other data entry device. The field is then transmitted to the server (104) using one of the mechanisms described above.

A radio button group is a listing of possible alternatives in the web page each having a "button" associated with it. By clicking on an associated button, the user can indicate the alternative in the list that is desired or applies to that user. With a radio button group, selection of any one button automatically clears selection of any other button in the group so that only a single selection can be made. The selection is then transmitted to the server (104) using one of the mechanisms described above.

A check box group is a listing of items in the web page, each having a "box" associated with it. The user can look down the listing and click the box of each item that applies or that the user wishes to select. Unlike with a radio button group, any number of selections can be entered. The selections are then transmitted to the server (104) using one of the mechanisms described above.

A list box is a listing of alternative items, usually associated with a particular field in a form on the web page that a user is filling in. Typically, the listing appears when the box or field is selected by the user. The user can then click on an entry in the list to provide that listing as the entry to the box. For example, if entering an address, the user may click a list box associated with the field for "State." The list box then provides a listing of the 50 United States. The user then clicks on the state that is part of his or her address and the "state" field of the address entry form is automatically filled with that state name. The entered data may then be transmitted to the server (104) using one of the mechanisms described above.

A data entry form on a web page may include one or all of the data entry devices described above. For example, a commercial web page soliciting information from a potential customer may employ a radio button group with the options male or female to determine the sex of the remote user, a text field for entry of the remote user's street address, a list box for entry of the state in which the remote user lives and a check box group for entry of a list of the company's products in which the remote user has an interest.

Problems of the prior art arise when the web-page is to be used by customers or potential customers who speak a variety of different languages. The present invention helps solve this problem. According to the present invention, the remote user accessing the web-site (100) may be provided with an initial web page in a default language, for example, English. The page, however, also provides a data entry device, e.g. a radio button group, that lists other languages in which the web-page can be made to appear.

Additionally, different users may have different purposes in accessing the web-site (100). Consequently, different data entry forms may be desired by different users. For example, a registered user who needs to communicate with the web-site sponsor may desire a form in which the user can (1) select a division of the company sponsoring the web-site or a particular person in the organization sponsoring the web-site; (2) enter text comments or questions and (3) transmit the input to the designated recipient. Another user may wish to enter demographic information about himself or herself and request information on specific products or services, as in the example described above. The web-page resident on the web-site (100) can, therefore, make a number of different data entry forms available to remote users.

Figure 2:
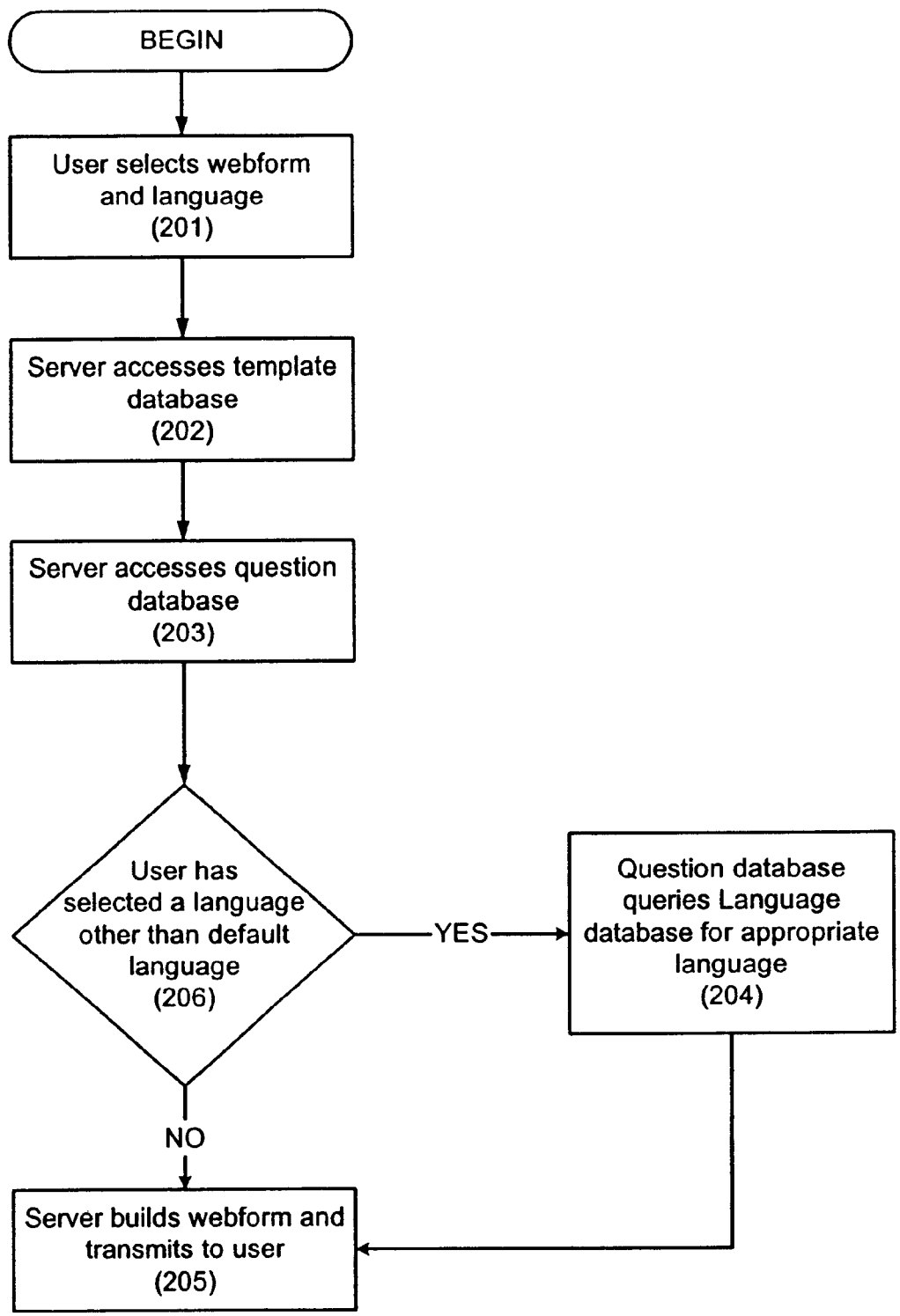
FIG. 2 is a flowchart of a method of providing web-site interaction with a user in an appropriate language according to the present invention.

As shown in FIG. 2, the method of the present invention begins when the remote user accesses the web-site (100) and specifies a data entry form or web form. As used herein, a web form is a web page, or portion thereof, containing CGI scripts for receiving data from a remote user. Web forms also generally have a particular format or layout.

The remote user also specifies a language in which he or she wishes to communicate. (201). Upon receiving this data, the server (104) accesses the databases shown in FIG. 1. As will be understood by those skilled in the art, these databases could be internal to the server (104) or resident on other computers that communicate with the server (104).

The server (104) accesses a template database (103). (FIG. 2; 202). The template database (103) stores a template for each web form available to remote users through the web-site (100). Each template specifies the layout of the web form, for example, the data entry elements to be included on the web form, their appearance and spatial relationship to each other. The template also specifies the location of explanatory text and other elements that may be part of the web page that includes the web form.

The server (104) also accesses a question database (102). (FIG. 2; 203). The question database (102) contains the text and content of the various data entry devices in the web form, for example, text fields, radio button groups, check box groups and list boxes. The question database (102) also includes the text of the instructions or explanations that may be printed on the web page along with the various data entry device and other elements.

The server (104) will also determine if the user has requested the selected web form in a language other than the default language (206). If so, while accessing the question database (102), a language database (101) is also accessed (204). The language database (101) contains counterpart text elements to the text elements in the question database (102) prepared in a variety of different languages. Thus, if the default language is English and the user has specified Japanese, the text elements for the desired web form in English (which are stored in the question database (102)) are substituted for counterpart text elements in Japanese (which are stored in the language database (101)).

When the server (104) has retrieved the template data and the question data in the appropriate language, the server (104) will assemble a web form with the appropriate data entry devices in the appropriate language as arranged according to the appropriate template (FIG. 2; 205). The completed web form is the transmitted as a web page, e.g. an HTML file, to the requesting remote user via the web (105).

In this way, the remote user can receive the web form required to perform whatever communication function the remote user intends, while receiving and interacting with the web form in a language understood by that remote user. Moreover, remote users who speak different languages can all be accommodated by accessing the same web-site (100).

The present invention also encompasses the software required to accomplish the database management, web form and web page generation described above. Specifically, the present invention may include software running on the server (104) that allows the server to access and manage the template (103), question (102) and language (101) databases so as to prepare the desired data entry form in the specified language in response to a request from a remote user over the web (105) and transmit that data entry form as an interactive web page. Software as used herein encompasses any computer-readable instructions stored in any medium for recording such instructions including, but not limited to, applications in any programming language, ASICs, firmware, etc. The "software" of the present invention may be computer-readable instructions executed on a host computer, a microprocessor, an ASIC, firmware, etc.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A web-site for soliciting data from remote users in a plurality of languages, the web-site comprising:
    a question database containing questions and data entry devices corresponding to a number of data entry forms, wherein text stored in said question database is in a default language; and
    a language database containing counterpart text for said text in said question database, said counterpart text being in at least one language other than said default language.

2. The web-site of claim 1, further comprising a server connected to the Internet or World Wide Web for receiving and transmitting data;
    wherein said server accesses said question and language databases to prepare a web page for transmission that includes a data entry form requested by a remote user with text in a language specified by that remote user.

3. The web-site of claim 2, further comprising a template database which specifies a layout and appearance for each of said data entry forms.

4. The web-site of claim 1, wherein said data entry devices include any of text fields, radio button groups, check box groups and list boxes.

5. A method of operating a web-site for soliciting data from remote users in a plurality of languages, the method comprising:
    providing a question database containing questions and data entry devices corresponding to a number of data entry forms, wherein text stored in said question database is in a default language; and
    providing a language database containing counterparts for said text in said question database in at least one language other than said default language.

6. The method of claim 5, further comprising:
    connecting a server to said question and language databases and to the Internet or World Wide Web for receiving and transmitting data; and
    accessing said question and language databases with said server to prepare a web page for transmission that includes a data entry form requested by a remote user with text in a language specified by that remote user.

7. The method of claim 6, further comprising providing a template database which specifies a layout and appearance for each of said data entry forms.

8. The method of claim 5, wherein said data entry devices include any of text fields, radio button groups, check box groups and list boxes.

9. A web-site for soliciting data from remote users in a plurality of languages, the web-site comprising:
    first means for storing questions and data entry devices corresponding to a number of data entry forms, wherein text stored in said first means for storing is in a default language; and
    second means for storing counterpart text for said text in said first means for storing, said counterpart text being in at least one language other than said default language.

10. The web-site of claim 9, further comprising processing means connected to said first and second means for storing and to the Internet or World Wide Web for receiving and transmitting data;
    wherein said processing means accesses said first and second means for storing to prepare a web page for transmission that includes a data entry form requested by a remote user with text in a language specified by that remote user.

11. The web-site of claim 10, further comprising a third means for storing data which contains data specifying a layout and appearance for each of said data entry forms.

12. The web-site of claim 9, wherein said data entry devices include any of text fields, radio button groups, check box groups and list boxes.

13. Software for operating a web-site for soliciting data from remote users in a plurality of languages, the software comprising computer-readable instructions recorded in a medium for storing computer-readable instructions, wherein said instructions cause a processing unit to:
    access and manage a question database containing questions and data entry devices corresponding to a number of data entry forms, wherein text stored in said question database is in a default language; and access and manage a language database containing counterparts for said text in said question database in at least one language other than said default language.

14. The software of claim 13, further comprising:

computer-readable instructions running on a server connected to said question and language databases and to the Internet or World Wide Web for receiving and transmitting data;

wherein said computer-readable instructions cause said server to access said question and language databases to prepare a web page for transmission that includes a data entry form requested by a remote user with text in a language specified by that remote user.

15. The software of claim 14, further comprising computer-readable instructions which cause said server to access and manage a template database which specifies a layout and appearance for each of said data entry forms.

16. The software of claim 13, wherein said data entry devices include any of text fields, radio button groups, check box groups and list boxes.

17. A web-site for soliciting data from remote users in a plurality of languages, the web-site comprising:

a question database containing questions and data entry devices corresponding to a number of data entry forms, wherein text stored in said question database is in a default language;

a language database containing counterpart text for said text in said question database, said counterpart text being in at least one language other than said default language;

a template database which specifies a layout and appearance for each of said data entry forms; and a server connected to the Internet or World Wide Web for receiving and transmitting data;

wherein said server accesses said template database and said question and language databases to prepare a web page for transmission that includes a data entry form requested by a remote user with text in a language specified by that remote user and in a format specified in said template database.

18. A method of operating a web-site for soliciting data from remote users in a plurality of languages, the method comprising:

providing a question database containing questions and data entry devices corresponding to a number of data entry forms, wherein text stored in said question database is in a default language;

providing a language database containing counterparts for said text in said question database in at least one language other than said default language;

providing a template database which specifies a layout and appearance for each of said data entry forms;

providing a server with access to said template, question and language databases and to the Internet or World Wide Web for receiving and transmitting data; and accessing said template, question and language databases with said server to prepare a web page for transmission that includes a data entry form requested by a remote user with text in a language specified by that remote user and in a format specified in said template database.

19. A web-site for soliciting data from remote users in a plurality of languages, the web-site comprising:

first means for storing questions and data entry devices corresponding to a number of data entry forms, wherein text stored in said first means for storing is in a default language;

second means for storing counterpart text for said text in said first means for storing, said counterpart text being in at least one language other than said default language;

third means for storing data which contains data specifying a layout and appearance for each of said data entry forms; and processing means having access to said first, second and third means for storing and to the Internet or World Wide Web for receiving and transmitting data;

wherein said processing means accesses said first, second and third means to prepare a web page for transmission that includes a data entry form requested by a remote user with text in a language specified by that remote user and in a format specified in said third means for storing.

20. Software for operating a web-site for soliciting data from remote users in a plurality of languages, the software comprising computer-readable instructions recorded in a medium for storing computer-readable instructions, wherein said instructions cause a processing unit to:

access and manage a question database containing questions and data entry devices corresponding to a number of data entry forms, wherein text stored in said question database is in a default language;

access and manage a language database containing counterparts for said 10 text in said question database in at least one language other than said default language; and access and manage a template database which specifies a layout and appearance for each of said data entry forms;

wherein said computer-readable instructions are executed on a server with access to said template, question and language databases and to the Internet or World Wide Web for receiving and transmitting data; and wherein said computer-readable instructions cause said server to access said template, question and language databases to prepare a web page for transmission that includes a data entry form requested by a remote user with text in a language specified by that remote user and in a format specified in said template database.

* * * * *